Dec. 11, 1928.
A. E. NASH ET AL
1,694,393
RADIATING COMBUSTION CHAMBER
Filed Jan. 4, 1924   3 Sheets-Sheet 1
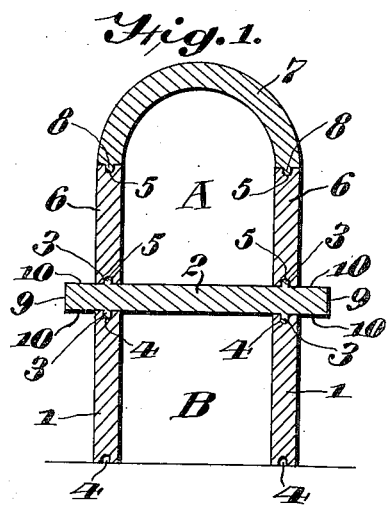
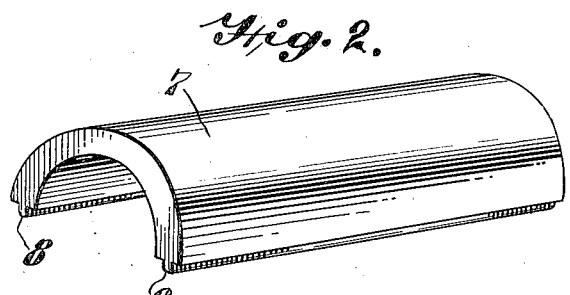
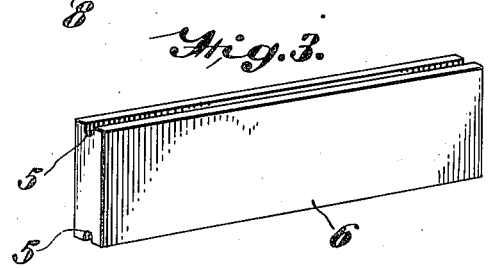
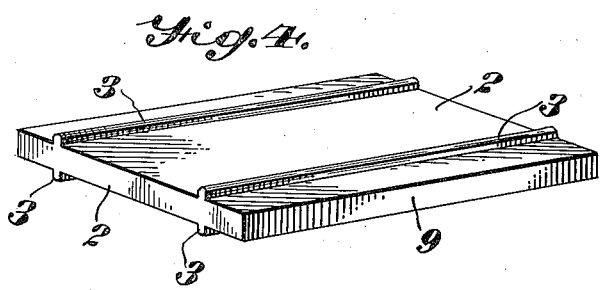
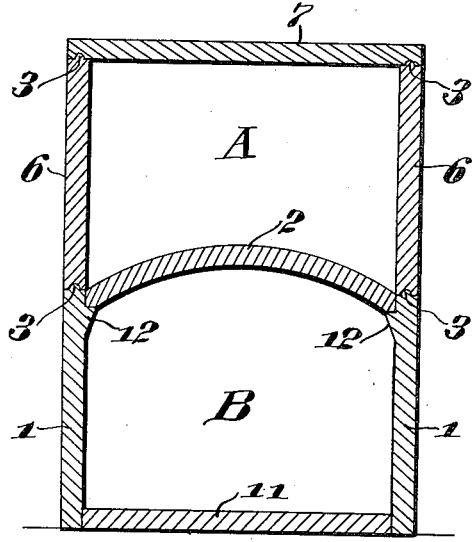
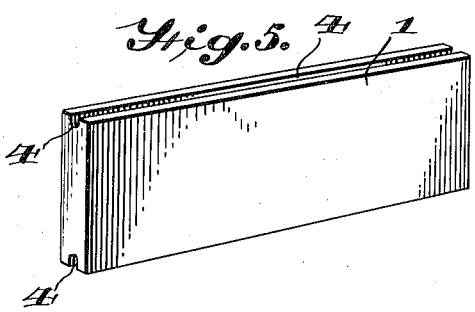
INVENTORS
James S. Alcorn and
Arthur E. Nash
BY Cornelius D. Ehret
their ATTORNEY.

Dec. 11, 1928.
A. E. NASH ET AL
1,694,393
RADIATING COMBUSTION CHAMBER
Filed Jan. 4, 1924      3 Sheets-Sheet 2
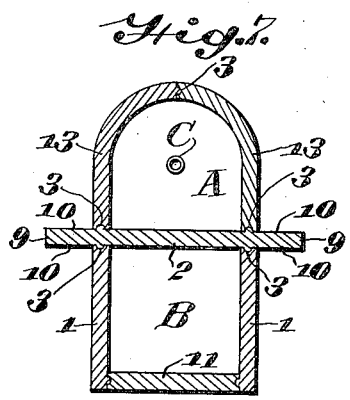
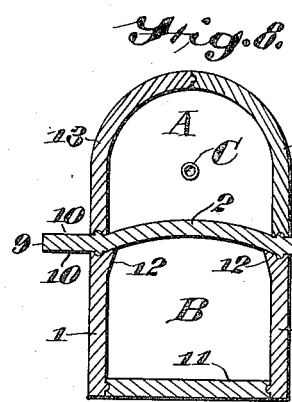
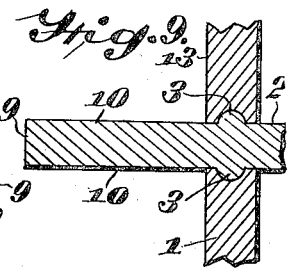
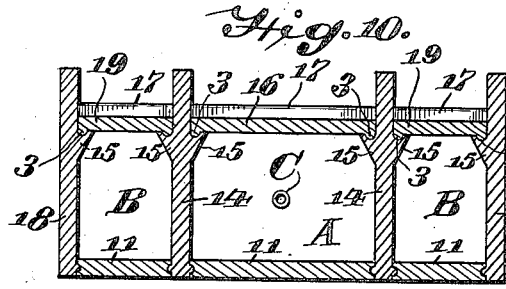
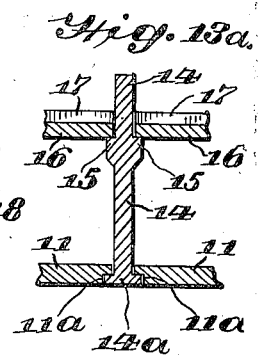
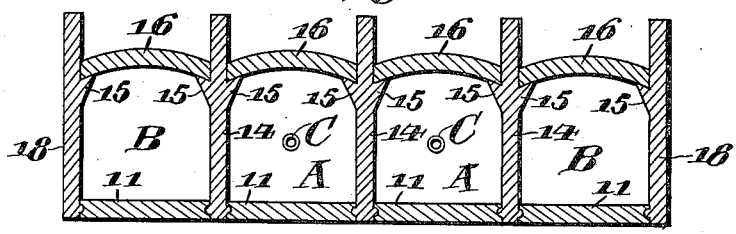
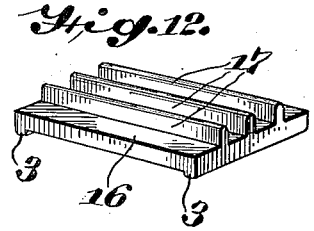
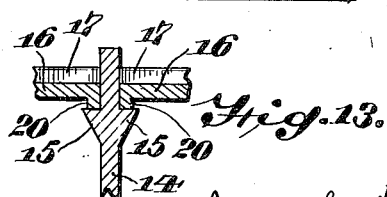
INVENTORS:—
James S. Alcorn and
BY Arthur E. Nash
Cornelius L. Ebret
their ATTORNEY.

Dec. 11, 1928.  A. E. NASH ET AL  1,694,393
RADIATING COMBUSTION CHAMBER
Filed Jan. 4, 1924    3 Sheets-Sheet 3
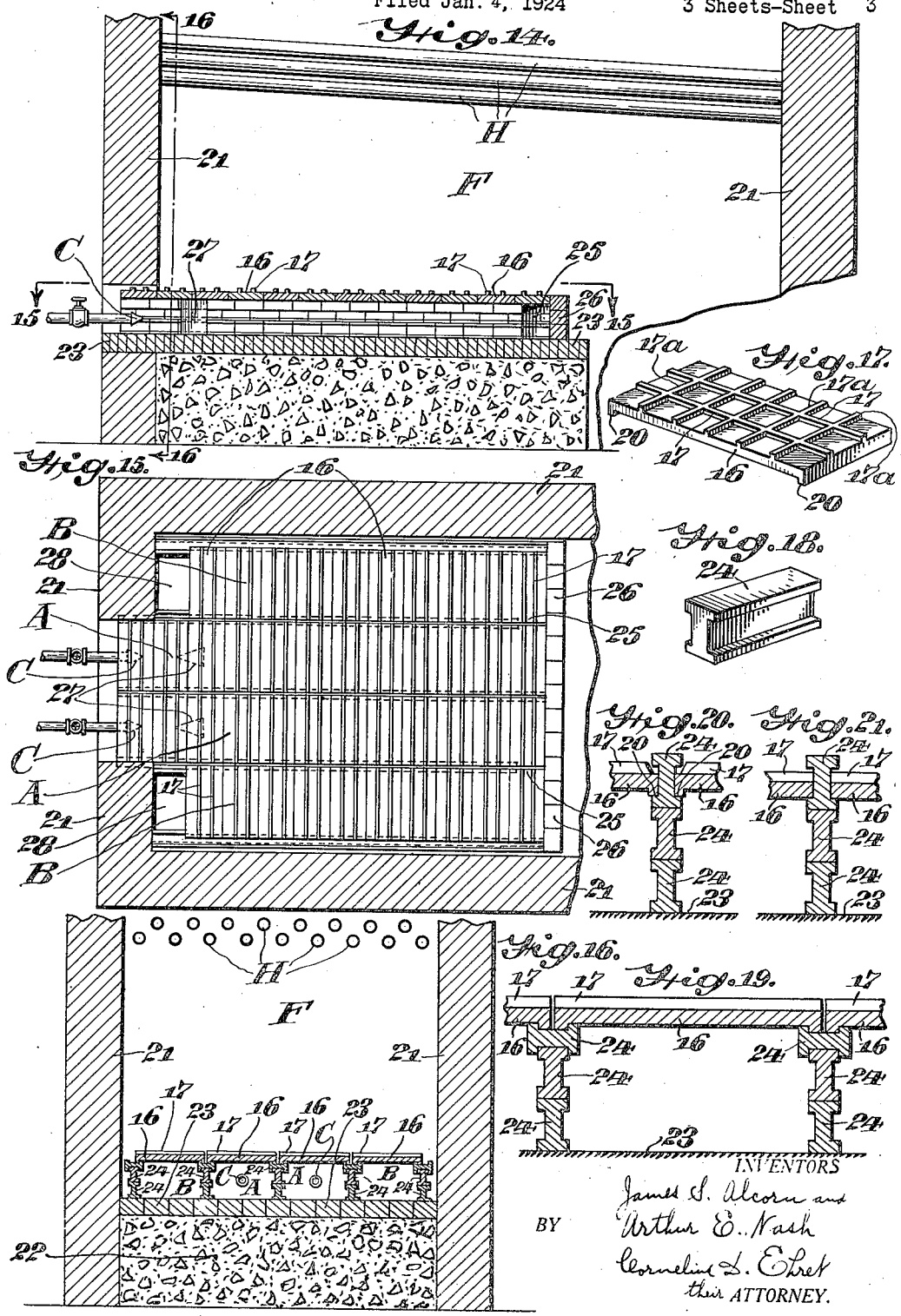

Patented Dec. 11, 1928.

1,694,393

UNITED STATES PATENT OFFICE.

ARTHUR E. NASH, OF PHILADELPHIA, AND JAMES S. ALCORN, OF CYNWYD, PENNSYLVANIA, ASSIGNORS TO ALCORN COMBUSTION COMPANY, OF PHILADELPHIA, PENNSYLVANIA, A CORPORATION OF DELAWARE.

RADIATING COMBUSTION CHAMBER.

Application filed January 4, 1924. Serial No. 684,456.

Our invention relates to combustion chambers, and more particularly to combustion chambers which effect heat transfer to material or heat absorbing structure by radiation or by radiation and the hot gaseous products of combustion.

In accordance with our invention, the combustion chamber structure comprises walls and dividing walls consisting entirely or partially of tile, slabs, plates or like members of suitable or special shapes or construction, having high heat conductivity and capable of withstanding high temperatures, principally consisting of masses or particles of carborundum or silicon carbide, zirconium oxide, or equivalent, or mixtures of any two or more of them, held together with or without suitable binder capable of resisting high temperatures, the internal or dividing wall members being so formed or of such structure that they will more readily remain in place or will not be deformed though they should break or crack or become softened under the influence of high temperatures.

Further in accordance with our invention, the internal or dividing wall members, or some of them, extend to and preferably beyond the external surface of the combustion chamber to radiate heat in amount sufficient to maintain the members at relatively lower temperatures preventing or reducing likelihood of fracture or deformation.

Further in accordance with our invention, the external walls or some of them, of the combustion chamber structure, and particularly those walls which are subjected by their own weight to forces tending to fracture or deform them, are strengthened by reinforcing members, which in addition increase the heat radiating surface which reduces the temperatures which the wall members must withstand.

Our invention resides further in a combustion chamber comprising chambers or passages disposed side by side, as distinguished from super-position one over the other.

Our invention resides in combustion chamber structure and elements thereof of the character hereinafter described and claimed.

For an illustration of some of the many forms our invention may take, reference is to be had to the accompanying drawings, in which:

Fig. 1 is a vertical sectional view of a combustion chamber embodying our invention.

Figs. 2, 3, 4 and 5 are perspective views of the different component parts of the structure of Fig. 1.

Figs. 6, 7 and 8 are vertical sectional views of modified forms of combustion chambers embodying our invention.

Fig. 9 is a fragmentary sectional view, on enlarged scale, of a locking joint which may be utilized in accordance with our invention.

Figs. 10 and 11 are vertical sectional views of combustion chambers embodying our invention and characterized by the location of the different chambers or passages side by side.

Fig. 12 is a perspective view of a wall element embodying our invention and utilizable in structures such as illustrated in Fig. 10 and others.

Fig. 13 is a fragmentary sectional view of a modified form of joint utilizable in the structures of Figs. 10, 11 and others.

Fig. 13ª is a fragmentary sectional view of a further modification.

Fig. 14 is a longitudinal vertical sectional view, parts in elevation, of a furnace provided with combustion chamber structure embodying our invention.

Fig. 15 is a horizontal sectional view, partly in plan, taken on the line 15—15 of Fig. 14.

Fig. 16 is a transverse vertical sectional view taken on the line 16—16 of Fig. 14.

Fig. 17 is a perspective view of a wall element utilizable in the structure of Fig. 14, and in other forms of our combustion chamber.

Fig. 18 is a perspective view of another element utilizable in the structure of Fig. 14 and other combustion chambers embodying our invention.

Fig. 19 is a vertical sectional view, on anlarged scale, of part of the structure shown in Fig. 16.

Figs. 20 and 21 are fragmentary vertical sectional views of modified structures.

For the sake of brevity in the following description and in the appended claims the term carborundum is employed in a generic sense to include respectively tile, slabs, plates and other shapes of silicon carbide or carborundum, zirconium oxide, or any equivalent highly refractory material, or mixture of any two or more of them, in mixture with or without any suitable binder capable of withstanding the high temperatures involved.

Referring to Fig. 1 there is illustrated a combustion chamber comprising the superimposed chambers or passages A and B, preferably connected in series or tandem with each other, into one end of either of which, gaseous, liquid, powdered or other fuel is introduced to effect combustion which progresses along one or both of the passages, the hot gaseous products of combustion escaping from the end of the other passage or chamber.

The temperatures involved are high, such for example as will or may raise the walls or wall elements to bright incandescence, the temperatures therefore being of the order of 2000 to 3500 degrees F.

Upon the lower wall elements 11, disposed end to end and forming the side walls of the chamber or passage B, are disposed the internal or dividing wall elements 2, provided with locking lugs or ribs 3, engaging in correspondingly shaped grooves 4 in the upper edges or sides of the members 1. The members 2 are provided on their upper surfaces with similar tongues or ridges 3, which engage in similarly shaped grooves 5 in the lower sides or edges of the wall members 6, 6, disposed end to end and forming the side walls of the upper chamber or passage A. The top wall elements 7, preferably arched, are provided with the tongues or ribs 8 engaging in grooves 5 in the upper edges or sides of the members 6.

The members 7, because of their bowed or arched shape, resist deformation under the influence of high temperature and should they crack or fracture will nevertheless remain in operative position. It will of course be understood that in lieu of a curvilinear bow or arch shape the members 7 may comprise two or more flat portions which will have like advantage.

When the combustion chamber is in operation the members 1, 2, 6 and 7 attain high temperatures and large amounts of heat are radiated to the heat absorbing material or structure external to the combustion chamber. The products of combustion may be led directly to the flue or stack but may also, and preferably, be utilized after discharge from one or the other of the passages A and B into the space external to the combustion chamber and there deliver heat to the same or different material or heat absorbing structure which absorbs the aforesaid radiant heat.

The end surfaces 9 of the member 2 extend at least to the external surfaces of the members 1 and 3 and, as indicated, preferably extend well beyond, forming a cantilever structure which suitably strengthens the member 2 to resist deformation or fracture and dislocation under the influence of the high temperatures to which it is subjected. The member 2 is further protected against deformation or rupture and dislocation by conduction of heat from the portions lying within the combustion chamber to its exposed ends, which radiate the heat so conducted away from the inner portions of the member 2. The extent of the surface of the member 2 exposed outside of the combustion chamber is a function of the sum of the heights of the surfaces 9, and the lengths of the surfaces 10. The exposed surface of the member 2 is preferably made substantial, and may be made substantially equal to the outer exposed surface of either of the members 1 or 6.

In Fig. 6 the combustion chamber again comprises the superimposed chambers or passages A and B. The bottom member 11 may be utilized or not as desirable and may comprise either carborundum or ordinary fire brick. In this instance the side wall members 1 carry directly the side wall members 6 spanning which latter is the cover member 7, the members 1 having tongues or ridges 3 engaging in corresponding grooves of members 6 which in turn may be provided with tongues or ribs 3 engaging in corresponding grooves in the members 7.

The members 1 are provided with inwardly extending ledges 12 upon which rest the dividing wall members 2 arched to cause them to resist deformation or dislocation.

In Fig. 7 the chamber or passage A is comprised of only two members 13 comprising straight vertical portions and inwardly turned arched portions, the several members being locked to each other by the ridge and groove structure indicated. In this example the fuel delivering device or burner C is shown in the chamber or passage A, it being understood however that it may be placed in either passage, A or B.

In Fig. 8 the arrangement is in general that of Figs. 1 and 7 but the dividing wall members 2 are arched or upwardly bowed and are in part supported by the inwardly extending ledges 12 upon the members 1.

In Fig. 9 there is shown on a larger scale the member 2 disposed between the members 1 and 13 and provided with the locking lugs or ridges 3 engaging in corresponding grooves of the members 1 and 13 as indicated in Fig. 7 and others.

In Fig. 10 the combustion chamber comprises a chamber or passage A, in which combustion is initiated by the fuel delivering device or burner C, and the side chambers or passages B to which the combustion gases are delivered from the chamber A at its end opposite to the burner C, the gases then flowing backwardly in opposite direction through the passages B, B.

In addition to the bottom members 11, which may be utilized or not as may be suitable, there are provided the vertically extending members 14, 14, having the ledges 15, 15 having grooves receiving the ribs 3 upon the cover tile or members 16 which, as more clearly indicated in Fig. 12, may have the strengthening and heat radiating ribs 17 or which may have in addition a second set of transversely extending and heat radiating ribs indicated in Fig. 17. The outside wall members 18, 18 are provided with the inwardly extending ledges 15, which with the ledges 15 and the members 14, support the cover tile or members 19 also provided with strengthening and heat radiating ribs 17.

The members 14 and 18 project to the exterior of the combustion chamber structure and above the cover members 16 and 19 to increase the heat radiating surface and by conduction to prevent the temperature within the members 14 and 18 within the chambers A and B attaining destructive magnitude.

In Fig. 11 is shown a generally similar arrangement comprising however, two chambers or passages A disposed side by side and with their cooperating members B, B, disposed beside them. In this example again the members 14 and 18 project upwardly beyond the top of the chamber structure for increasing heat radiation and for prevention of excessive temperature rise of the members 14 and 18 within the combustion chamber structure. In this instance, by way of example, utilizable also in connection with Fig. 10, the cover members 16 are arched or bowed upwardly. As indicated in Fig. 13 the cover members 16, particularly when flat as indicated in Figs. 10 and 12, may have downwardly turned ends or ribs 20 resting upon the ledges 15.

In Fig. 13$^a$ the member 14, utilizable for dividing wall and end wall members, is again provided with ledges 15, carrying the tile, slabs or members 16, with ribs 17, or arched shaped members 16, as indicated in Fig. 11. The member 14 again preferably extends well above the slabs or cover members 16, to effect radiation of heat conducted thereto through and from that portion of the member 14 disposed within the combustion chamber. At its lower end the member 14 is provided with the pedestal 14$^a$, received in the notches or recesses 11$^a$ in the base or floor members 11. The pedestal 14$^a$ preferably extends laterally of the member 14 to a distance approximately equal to the width of the ledges 15.

Referring to Figs. 14 to 19 inclusive, there is shown a furnace F, having the walls 21 within which are disposed the heat absorbing structures H of any suitable character, and for any suitable purpose, such as tubes containing water, for steam generation, or containing oil for distillation or cracking, or for any other purpose.

Disposed within the furnace chamber F is the filling 22 upon which are disposed the bottom forming members 23 of fire brick or other suitable material. Upon the bottom 23 rest the superposed members 24 of carborundum, of any suitable shape, but preferably as indicated of I shape. Upon members 24 are disposed further members 24 in horizontal position as best indicated in Fig. 9. Carried by the columns of members 24 are the cover members 16 provided with strengthening and heat radiating ribs 17, and, as indicated in Fig. 17, provided in addition if desired with the transversely strengthening and heat radiating ribs 17$^a$. The members 16 are provided with downwardly projecting ends or ribs 20 which as indicated in Figs. 16 and 19, rest upon the horizontal I members 24, it being understood that the members 24 and 16 are of carborundum or equivalent for effecting radiation of heat from the external surfaces across the space of the furnace F to the heat absorbing structure H.

In the example illustrated there are formed two chambers or passages A at the forward ends of which are disposed the fuel delivering devices or burners C. Beside the passages or chambers A are the passages or chambers B communicating respectively with their adjacent chambers or passages A by passages 25, Figs. 14 and 15, at the rear ends of the walls between the chambers A and B, the wall between the chambers A, A, being continuous and extending to the rear wall 26. The fuel ignited at the burner C and the combustion supporting air are passed toward the right past the baffle members 27 along the chambers A, A, thence at the rear ends into the chambers or passages B, B thence forwardly to the openings 28 where the combustion gases escape into the furnace chamber F, passing around and between the heat absorbing members H to flue or stack.

Accordingly the heat absorbing structure H receives heat radiated from the external exposed surfaces of the combustion chamber structure and receives heat also by conduction or convection from the hot combustion gases after their escape from the chambers B through passages 28 into the furnace F.

As indicated in Fig. 20, the three members 24 are superposed in column formation, the uppermost extending to the exterior of the structure and thereby increasing the heat radiating surface and reducing the temperatures of the members 24 within the structure. The slabs or tile 16 in this instance rest by their ribs 20 upon the lower head of the upper tile 24, the strengthening and heat radiating ribs 17 being suitably cut away as indicated.

In Fig. 21 the arrangement is in general the same except that the structure of the slabs or tile 16 is simpler, the ribs 20 being omitted and the ribs 17 extending the ends of the members 16 into substantial engagement with the uppermost member 24.

As viewed in Fig. 16, it will be observed that the extreme left and extreme right side walls of the chambers B, B, more or less closely approach the furnace walls 21 and are not in position to radiate heat advantageously. These side wall members may accordingly be made of cheaper material, such for example as employed in the manufacture of fire brick or the like.

In combustion chamber structure of the character indicated in Figs. 1, 6, 7 and 8, where the chambers or passages are superposed, the dividing wall members 2 are subjected to strains, due to their own weight, which may be sufficient to deform them or actually rupture them under excessively high temperatures which tend to cause the components to flux and soften but by recourse to the projection of the members 2 to the exterior of the furnace, and by arching them, the aforesaid disadvantages are overcome.

However, by arranging the chambers or passages, side by side, as in the structures of Figs. 10, 11 and 14 to 16 inclusive, the combustion chamber septum or dividing wall is disposed vertically, and therefore the forces acting thereon effect compression, and in compression these members have greater strength than in the case of horizontally disposed members as the dividing walls 2 of Figs. 1, 6, 7 and 8. Accordingly in many instances the side by side arrangement of Figs. 10, 11 and 16 will be preferable, particularly where space in horizontal directions is sufficient for the purpose. On the other hand, where space horizontally is small or restricted the chambers may be superposed as indicated in Figs. 1, 6, 7 and 8 in which case the improved structure of the dividing wall members 2 will serve to prevent deformation or dislocation upon fracture.

What I claim is:

1. Combustion chamber structure comprising refractory wall members, and a dividing wall member of silicon carbide disposed within and supported by said wall members and having a heat-radiating surface external to said chamber for lowering the temperature of the portion of said dividing wall member within the combustion chamber.

2. Combustion chamber structure comprising wall members, a substantially horizontal wall member of silicon carbide dividing the space within said wall members into separate chambers, said wall member having a portion extending beyond the exterior of said wall members to form a heat-radiating surface for lowering the temperature of the portion of said dividing wall member within the combustion chamber.

3. Combustion chamber structure comprising vertically disposed wall members spaced from each other horizontally to form passages disposed side by side, and silicon carbide wall members supported by and disposed between said first named wall members to effect covers for said passages, at least one of said vertically disposed wall members composed of carborundum and projecting above and beyond said covers to effect heat radiation for lowering the temperature of the portion of the said one of said vertically disposed wall members beneath said covers.

4. Combustion chamber structure comprising wall members, a substantially horizontally disposed dividing wall member of silicon carbide forming adjacent combustion chambers with said members, said dividing wall member having a portion extending beyond the exterior of said wall members to form a heat-radiating surface for lowering the temperature of the portion of said dividing wall member within the combustion chambers, and means comprising a tongue and groove connection between the wall members first mentioned and said dividing wall member for retaining the latter in substantially its original position should fracture thereof occur.

5. A radiation combustion chamber, within which combustion is effected to heat the wall structure to incandescence to effect a source of radiant heat, comprising a wall element of refractory material of high heat conductivity having a portion exposed to the temperatures within said chamber, and an integral portion projecting exteriorly of said chamber for abstracting heat from said first named portion to lower its temperature, and to serve as a source of radiant heat.

6. A radiation combustion chamber, within which combustion is effected to heat the wall structure to incandescence to effect a source of radiant heat, comprising a plurality of component chambers, a refractory wall element of high heat conductivity constituting the division between said component chambers and having a portion subjected to the temperatures in the component chambers and having an integral portion projecting exteriorly for abstracting heat from said first named portion to lower its temperature, and to serve as a source of radiant heat.

7. A radiation combustion chamber, within which combustion is effected to heat the wall structure to incandescence to effect a source of radiant heat, comprising a plurality of component chambers, a refractory wall element of high heat conductivity constituting the division between said component chambers and having a portion subjected to the temperatures in the component chambers and having an integral portion projecting exteriorly for abstracting heat from said first named portion to lower its temperature, and to serve as a source of radiant heat, and wall members for adjacent component chambers engaging said wall element and themselves of refractory material of high heat conductivity serving as sources of radiant heat.

8. A radiation combustion chamber, within which combustion is effected to heat the wall structure to incandescence to effect a source of radiant heat, comprising a plurality of component chambers, a refractory wall element of high heat conductivity constituting the division between said component chambers and having a portion subjected to the temperatures in the component chambers and having an integral portion projecting exteriorly for abstracting heat from said first named portion to lower its temperature, and to serve as a source of radiant heat, and substantially horizontal wall members for adjacent component chambers engaging said wall element and themselves of refractory material of high heat conductivity serving as sources of radiant heat, and vertically rising rib structure integral with said wall members for strengthening them and serving as a radiant heat source.

In testimony whereof we have hereunto affixed our signatures this 2nd day of January, 1924.

ARTHUR E. NASH.
JAMES S. ALCORN.